US008520666B2

(12) United States Patent
Zisimopoulos et al.

(10) Patent No.: US 8,520,666 B2
(45) Date of Patent: Aug. 27, 2013

(54) COMMUNICATION METHOD FOR VOICE CALLS

(75) Inventors: Haris Zisimopoulos, Staines (GB); Craig Bishop, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 710 days.

(21) Appl. No.: 12/658,894

(22) Filed: Feb. 17, 2010

(65) Prior Publication Data

US 2010/0208670 A1    Aug. 19, 2010

(30) Foreign Application Priority Data

Feb. 18, 2009  (GB) .................................. 0902720.2

(51) Int. Cl.
*H04L 12/66*    (2006.01)
(52) U.S. Cl.
USPC ......................................................... 370/352
(58) Field of Classification Search
USPC ..................................................... 370/352–6
See application file for complete search history.

(56) References Cited

U.S. PATENT DOCUMENTS

| | | | |
|---|---|---|---|
| 2007/0297390 A1* | 12/2007 | Skog et al. ..................... | 370/352 |
| 2009/0086674 A1* | 4/2009 | Ejzak ............................. | 370/331 |
| 2009/0111423 A1* | 4/2009 | Somasundaram et al. .... | 455/410 |
| 2010/0165948 A1* | 7/2010 | Ore et al. ........................ | 370/331 |
| 2010/0309886 A1* | 12/2010 | Vikberg et al. ................ | 370/332 |
| 2011/0270995 A1* | 11/2011 | Mutikainen et al. .......... | 709/227 |

\* cited by examiner

*Primary Examiner* — Mark Rinehart
*Assistant Examiner* — Peter Cheng

(57) ABSTRACT

A communication method capable of providing voice communication between a first apparatus and a second apparatus includes establishing a voice call between the first apparatus and second apparatus to provide voice communication between the first and second apparatus. An identifier is generated to identify the voice call. During a first portion of the call, the voice communication is provided using a packet switched technique that includes conveying packets of voice data between the first and second apparatus via a communication connection. The communication connection is labelled with the identifier. During a second portion of the call, the voice communication is provided using a circuit switched technique that includes allocating a defined route to convey voice data between the first and second apparatus. Also during the second portion of the call, the identifier is used to manage said call.

21 Claims, 4 Drawing Sheets

COMMUNICATION METHOD FOR VOICE CALLS

CROSS-REFERENCE TO RELATED APPLICATION(S) AND CLAIM OF PRIORITY

The present application is related to and claims priority under 35 U.S.C. §119 of a United Kingdom patent application filed in the United Kingdom Intellectual Property Office on Feb. 18, 2009 and assigned Serial No. 0902720.2, the entire disclosure of which is hereby incorporated by reference.

TECHNICAL FIELD OF THE INVENTION

The present invention relates to methods and apparatus for providing voice communication, and in particular, although not exclusively, to the handover of multiple voice calls from a packet switched (PS) domain to a circuit switched (CS) domain.

BACKGROUND OF THE INVENTION

The Evolved Packet System (EPS) as it has been specified by the Third Generation Partnership Project (3GPP) is a PS only system (see 3GPP TS 23.401, "General Packet Radio Service (GPRS) enhancements for Evolved Universal Terrestrial Radio Access Network (E-UTRAN) access," the contents of which are hereby incorporated by reference in its entirety). This means there is no CS domain and the voice calls that are supported in EPS are provided through the PS domain only. Most likely these voice calls will be Voice over Internet Protocol (VoIP) calls and the underlying call control protocol will be Session Initiation Protocol (SIP) (see RFC3261, "Session Initiation Protocol," the contents of which are hereby incorporated by reference in its entirety) supported through the IP Multimedia Subsystem (IMS) (see 3GPP TS 23.228, "IP Multimedia Subsystem (IMS); Stage 2," the contents of which are hereby incorporated by reference in its entirety).

However, the coverage of access technologies providing the right characteristics in order to support VoIP will be "islands" in a sea of legacy 2G/3G legacy CS access technologies, which, of course, are required to support voice calls through the CS domain. Because the availability of this next generation access technologies, such as Long Term Evolution (LTE), will not be ubiquitous as is legacy CS access, such as Global System for Mobile Communications (GSM), a mechanism for a handover from a VoIP voice call to a legacy CS system would be beneficial. This mechanism that combines the access handover with the transfer of voice from PS to CS is called Single Radio Voice Call Continuity (SRVCC) and is defined in 3GPP TS 23.216, the contents of which are hereby incorporated by reference in its entirety.

Handovers from source system (or network or base transceivers subsystem or cells) to target system (or network or base transceivers subsystem or cells) is—from the User Equipment (UE) or terminal side perspective—for a session or transaction that stays within the same domain even if the UE moves from one system to another, i.e., CS to CS handover or PS to PS handover. In other words, from the UE perspective, a CS call originated in a Universal Mobile Telecommunications System (UMTS), when handed over to a GSM system, will still be the same CS call that was initiated in the UMTS system. Similarly a PS transaction initiated in UMTS and handed over to a GSM EDGE Radio Access Network (GERAN) system will remain a transaction of the PS domain.

In 3GPP systems, there is no other case for a handover in which the source transaction is originated in one domain (such as the PS domain) and ends up in a target system working in another domain (such as the CS domain).

It should be noted that the 3GPP Release 7 Voice Call Continuity (VCC) (or dual-radio VCC) (see TS 23.206, "Voice Call Continuity (VCC) between Circuit Switched (CS) and IP Multimedia Subsystem (IMS); Stage 2," the contents of which are hereby incorporated by reference in its entirety) feature that transfers voice calls between PS domains and CS domains is not a handover but, rather, a domain transfer that involves two calls (that is, the UE itself establishes a call in each of source and target domains).

Hence, SRVCC presents a unique challenge regarding how the association of the voice sessions that the UE has in place will be transferred between the PS and CS domains. Effectively, the status of the calls in the PS domain (IMS) has to be transferred to the CS domain during the SRVCC handover procedure. This is needed in order to subsequently support mid-call services (such as hold/unhold of voice sessions) when the UE moves to the CS domain, where the UE may not have the capability to signal using SIP/IMS signaling because simultaneous PS and CS connectivity is not possible due to the characteristics of the access network, e.g. in case of handing over to GSM with no Dual Transfer Mode (DTM) support.

More particularly, what identifies a CS call, in the Call Control state machines on both sides (that is, the UE and the network) is the CS Call Reference Identity. In 3GPP Non-Access Stratum (NAS), this is the Transaction Identity as defined in (see 3GPP TS 23.228). That Transaction ID identifies and relates a certain call on both the UE side and the network side regardless of which side originated that call. That Transaction ID is needed to tie and synchronize the Call Control state machines of both sides since, without that Transaction ID, neither side knows or can communicate and signal about that call.

With regard to existing solutions or attempted solutions, there have been several proposals concerning how these transaction IDs can be generated and passed between the PS and CS parts of the network and the UE in order to keep the UE and network synchronized.

These proposals (see 3GPP Temporary document: S2-087424; 3GPP Temporary document: S2-087893; and 3GPP Temporary document: S2-087713, the contents of which are hereby incorporated by reference in their entirety) rely on the UE and Service Centralization and Continuity (SCC) Application Server (AS) elements of the IMS Service Continuity architecture by first generating, and then communicating, the transaction IDs to the Mobile Switching Center Server (MSC-S) when the UE moves to the CS domain.

The main deficiency of these proposals is that the UE and SCC AS (elements of the IMS architecture—see 3GPP TS 23.237, "IP Multimedia Subsystem (IMS) Service Continuity; Stage 2," the contents of which are hereby incorporated by reference in its entirety, and 3GPP TS 23.292) are required to generate and maintain transaction IDs for all the voice calls that the UE has in place when the UE is still in the PS domain, and these transaction IDs may never be used since the UE may never handover to the CS domain. In addition, the UE and Core Network (CN) already have transaction IDs for the ongoing voice calls in the NAS layer that the UE has in place. Those are the transaction IDs that are used by the EPS bearers to transport the voice traffic when the UE is in the PS domain. Hence the generation of transaction IDs at the IMS layer (as proposed in the prior art, see 3GPP Temporary document:

S2-087424; 3GPP Temporary document: S2-087893; and 3GPP Temporary document: S2-087713) is a duplication of the same identifiers.

Thus, there is an inherent inefficiency with the current state of the art.

Another issue with the current state of the art is the added requirement that the MSC Server needs to support SIP, which is not a requirement in the current specifications 3GPP TS 23.292, "IP Multimedia Subsystem (IMS) Centralized Services; Stage 2," the contents of which are hereby incorporated by reference in its entirety.

SUMMARY OF THE INVENTION

To address the above-discussed deficiencies of the prior art, it is a primary object to provide a communication method for providing voice communication between a first apparatus and a second apparatus, the method comprising: establishing a voice call between the first apparatus and second apparatus to provide voice communication between the first and second apparatus; generating an identifier for identifying the voice call (such as for identifying a communication connection that is used to transport packets of the voice call); during a first portion of said call, providing said voice communication using a packet switched technique comprising conveying packets of voice data between the first and second apparatus via a communication connection, the communication connection (which may also be described as a bearer) being labeled (that is, identified) with said identifier; during a second portion of said call, providing said voice communication using a circuit switched technique comprising allocating a defined route (which may also be described as a circuit) for conveying voice data between the first and second apparatus and using said route to convey voice data between the first and second apparatus; and during said second portion of said call, using said identifier to manage (such as at least one aspect of) said call.

Thus, during the first portion of the call, a PS technique is used. There is then a handover to a CS technique, and the same identifier that was used to label the communication connection (bearer) carrying the packets in the PS regime is used to identify the voice call as it continues in the CS regime.

It will be appreciated that the identifier, which is suitable for use in identifying the voice call, is also suitable for identifying the communication connection (a bearer) setup and used to transport the packets of data (that is, carry the call) during the first, PS portion of the call.

In certain embodiments, a Mobility Management Entity (MME) is used to establish the voice call and activate (establish and setup) the communication connection (bearer) to convey the packets and so provide/enable the voice communication during the first portion of the call.

It will be appreciated that the communication connection (bearer) can comprise a plurality of connection nodes. As part of establishing the voice call, the identifier can be sent to a plurality of such nodes, which together then provide the connection. Thus, the communication connection is labeled with the identifier in the sense that each node in the communication connection is provided with the identifier and uniquely identifies the logical connection between the UE and the network nodes. In certain embodiments, such a bearer is an Evolved Packet System (EPS) bearer (as described in 3GPP TS 23.401 which uses transaction identifiers as defined in TS 24.301, "Non-Access-Stratum (NAS) protocol for Evolved Packet System (EPS); Stage 3," the contents of which are hereby incorporated by reference in its entirety).

In other embodiments, a Mobile Switching Center Server (MSC-S) is used to set up (that is, define and allocate) the route (circuit) used to convey voice data during the second portion.

Still, in other embodiments, the method further comprises: before the second portion, determining the existence of the voice call.

In some embodiments, determining the existence of the voice call comprises identifying the voice call as a voice call from a plurality of communication connections between the first apparatus and other apparatuses. This plurality of communication connections may comprise a number of other types of connections (such as, non-voice calls, such as data connections, video connections and such)

In some embodiments, the method comprises using (operating) a Mobility Management Entity (MME) to determine the existence of the voice call.

In some embodiments, the method further comprises transmitting the identifier (e.g. from the MME).

In some embodiments, transmitting the identifier comprises transmitting the identifier before the second portion (in other words, before or during the handover to the CS domain).

In some embodiments, transmitting the identifier comprises transmitting the identifier from a Mobility Management Entity (MME).

In some embodiments, the method further comprises receiving the transmitted identifier at a Mobile Switching Center Server (MSC-S).

In some embodiments, the method further comprises transmitting information indicative of a state of the voice call (e.g. whether it is on hold or active).

In some embodiments, transmitting information indicative of the state of the voice call comprises transmitting said information before the second portion.

In some embodiments, transmitting said information comprises transmitting said information from a Mobility Management Entity (MME).

In some embodiments, the method further comprises receiving the transmitted information at a Mobile Switching Center Server (MSC-S).

In some embodiments, using said identifier to manage the call comprises using the identifier to identify the call and further perform one or more mid-call services, such as switching the call between an active state and a hold state (which may also be described as a held state, or an on-hold state) during the second portion. Other examples of using the identifier to manage the call include: using the identifier to add a user (additional party) to the call during the second portion; and using the identifier to transfer the call to other apparatus or another user. In general, all different types of mid-call services which involve manipulation of the status of a certain voice call utilize the aforementioned identifier.

In some embodiments, the first apparatus is a user equipment (UE) (e.g. portable user equipment such as a mobile phone, cell phone, or Personal Digital Assistant).

Another aspect of the invention provides a communication method comprising: establishing a plurality of voice calls between a first apparatus and a respective plurality of second apparatus to provide voice communication between the first apparatus and each second apparatus; generating a respective identifier for identifying each voice call (such as for identifying the communication connection that is used to transport the packets of each voice call); during a first portion of each call, providing said voice communication using a packet switched technique comprising conveying packets of voice data between the first and respective second apparatus via a respective communication connection (bearer), each communication connection being labeled with the respective identifier; during a second portion of each call, providing said voice communication using a circuit switched technique comprising allocating a respective defined route (circuit) for conveying voice data between the first and respective second apparatus and using said respective route to convey voice data between the first and respective second apparatus; and during said second portion of each call, using the respective identifier to manage at least one aspect of each said call.

In other words, during a first (pre-handover) period the voice calls are maintained using a PS technique, and there is then a handover to the CS domain such that a CS technique is used to maintain the calls during a second (post-handover) period.

In some embodiments, the method further comprises: using a Mobility Management Entity (MME) to establish the voice calls;

using a Mobile Switching Center Server (MSC-S) to allocate the respective routes; and transmitting the plurality of respective identifiers from the MME to the MSC-S.

In some embodiments, the identifier of the first portion (i.e. each identifier used in the first portion used to identify the respective voice call or identify or label the respective bearer) is the transaction ID (NAS identifier) of the communication connection that is used to transport the packets of the respective voice call.

In some embodiments, the identifier of the second portion (that is used in the second portion to manage/control the respective voice call in the second portion) is the same transaction ID (NAS identifier) of the communication connection that is used to transport the packets in the first portion of the respective call.

Another aspect of the invention provides user equipment adapted to operate in accordance with a method for providing voice communication between a first apparatus and a second apparatus.

Another aspect provides an apparatus comprising means arranged to implement a method for providing voice communication between a first apparatus and a second apparatus.

Another aspect provides a computer program comprising instructions arranged, when executed, to implement a method for providing voice communication between a first apparatus and a second apparatus.

Another aspect of the invention provides machine-readable storage device that stores a computer comprising instructions arranged, when executed, to implement a method for providing voice communication between a first apparatus and a second apparatus.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
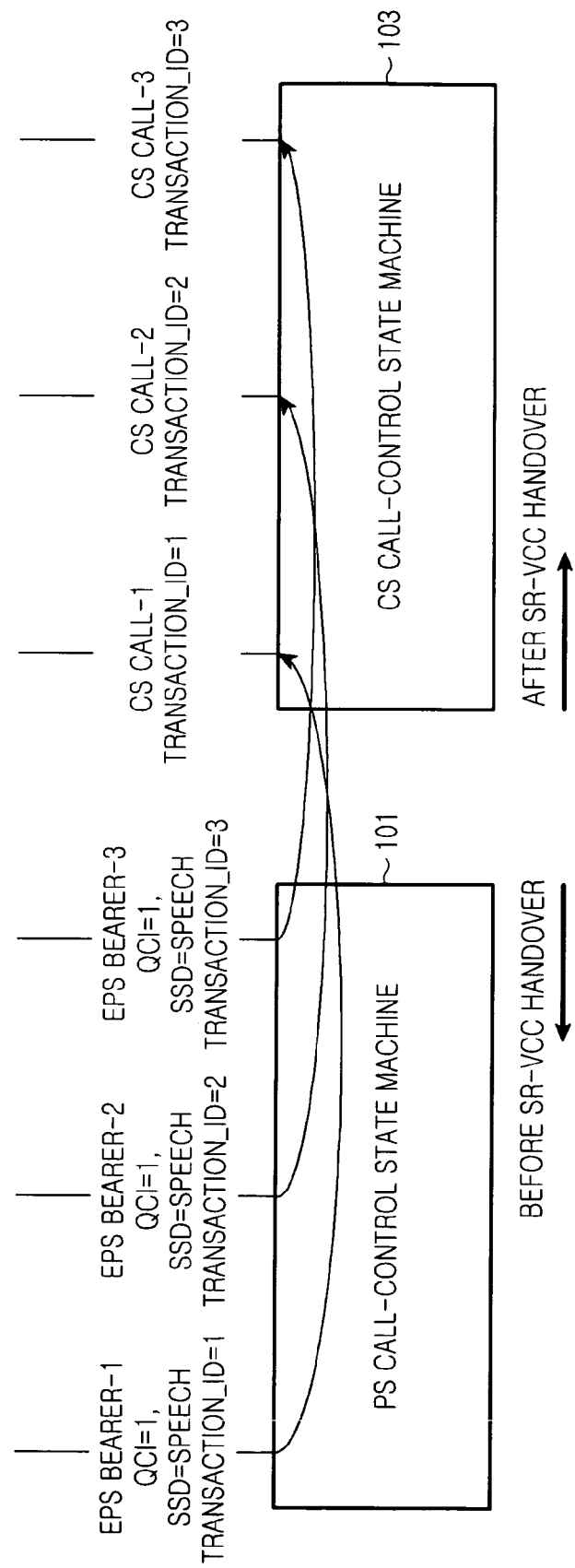
FIG. 1 illustrates the use of transaction IDs to label (identify) the respective EPS bearers of a plurality of calls before a handover, and the use of the same transaction IDs to identify the calls as they continue in the CS domain after the handover according to an embodiment of the invention.

FIGS. 1 through 3B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. It will be appreciated that certain embodiments of the invention provide a method to support multi-call handover in SRVCC. Certain embodiments apply to at least one of the following:

Next generation network element and terminal operating SRVCC handover;

Method to provide handover for multiple calls in SRVCC;

Method to provide handover for multiple calls in SRVCC utilizing an MSC Server that does not support SIP;

Method to provide handover for multiple calls in SRVCC utilizing a UE that does not retain PS connectivity after SRVCC handover; and Method to convey transaction identifiers between the PS and CS domain without communicating them through access handover procedures.

Some embodiments provide the feature of being orthogonal whether or not the MSC Server supports SIP, and being able to equally work for MSC Servers that support or do not support SIP.

Some embodiments do not rely on the generation of additional transaction IDs (NAS identifiers) at the time the UE is in the PS domain utilizing the SIP as the call control protocol. These embodiments also do not use the SIP to communicate NAS layer identifiers, which is a network protocol layer violation that is inherent in the current state of the art proposals.

Some embodiments of the invention rely on reusing the identifiers (transaction IDs) generated and used in the PS domain when the UE moves to the CS domain. These embodiments also provide a mechanism such that the MSC-S becomes aware of the status of the calls (that is, active/on hold) without relying on an extension of the SIP, but through addition of elements in the core network access protocol—such as General packet radio service (GPRS) Tunneling Protocol (GTP) or Proxy Mobile IP (PMIP)—communicated to the MSC-S through the handover procedure.

Embodiments will now be described that provide a method of reusing transaction IDs that were generated in the PS domain when the UE moves to the CS domain and having the core network (CN) to derive the status of the voice calls through procedures relying solely on underlying access network protocols.

The UE and network share the set of transaction IDs corresponding to the voice calls that the UE had in place in the PS (IMS) domain when the UE moves to the CS domain. This allows identifying the voice calls with the same identifiers in order to allow the UE to potentially perform mid-call services, such as to manipulate the status of these calls by resuming a call that is currently on hold when the UE is not capable to utilize the PS domain bearers.

Certain embodiments include the following pre-requisites: the voice calls in the PS domain are mapped to an EPS bearer in one-to-one manner (that is, there is no multiplexing of more than one voice call in a single EPS bearer), and there are unique bearer characteristics that will allow the MME to identify these bearers that constitute a voice bearer and be able to separate them from other PS bearers that the UE may have in place simultaneously.

The latter is a common assumption that is used and defined in 3GPP TS 23.216 and does not present a deviation from what is used in the current system.

The former involves a modification in the SRVCC specifications that will allow the proposed invention to work in an embodiment of a SRVCC solution with EPS core networks.

With regard to UE procedures in certain embodiments of the invention, a novel feature of the methods is the reuse of the transaction IDs that the UE was using when it was in the PS domain for the corresponding voice calls in the CS domain. This is illustrated in FIG. 1. The transaction identifier field is defined in TS 24.008, "Mobile radio interface Layer 3 specification; Core network protocols; Stage 3" (the contents of which are hereby incorporated by reference in its entirety) and the field bit-size is exactly the same between its use to identify EPS bearers (or packet data protocol (PDP) contexts for pre-release 8 systems) and CS call control.

Figure 2:
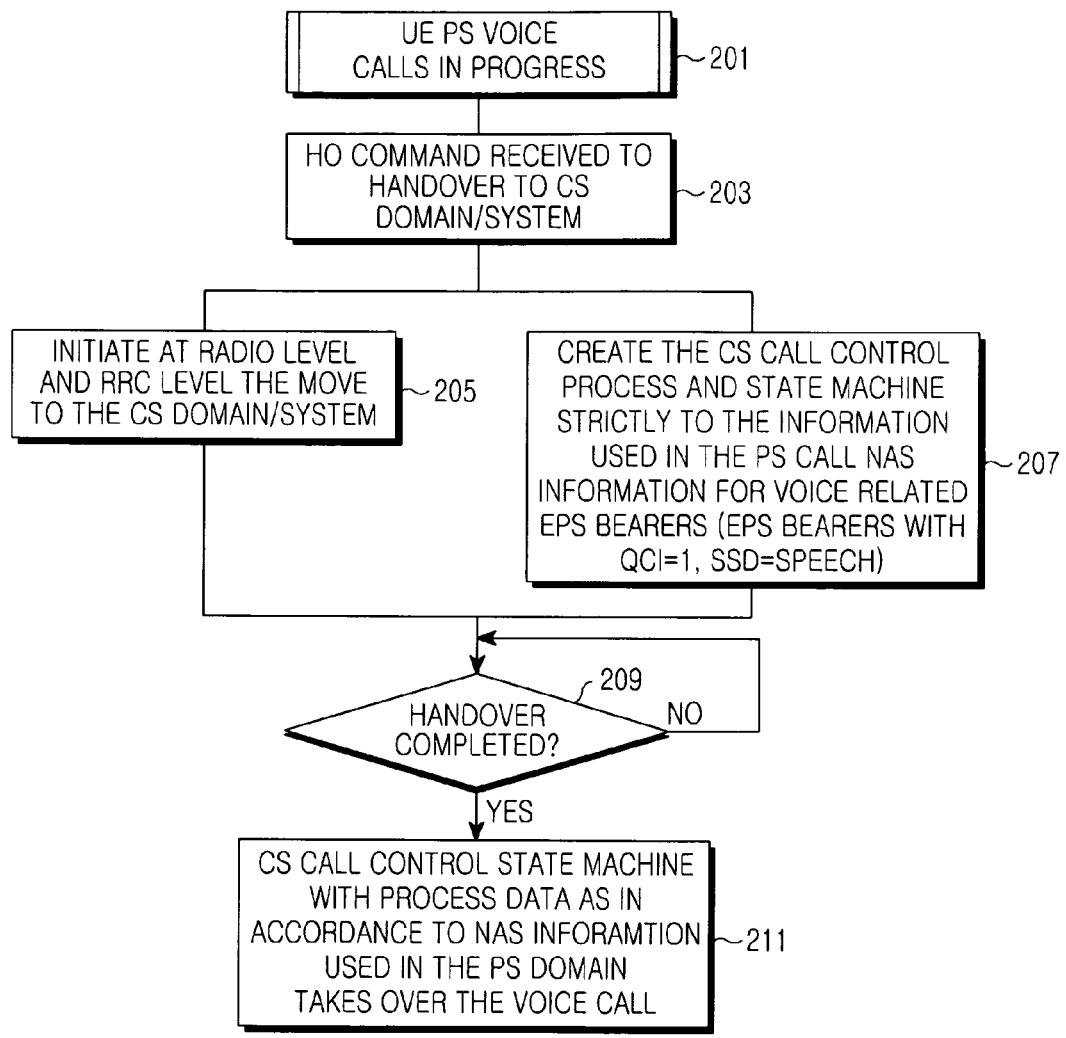
FIG. 2 illustrates a process for providing voice communication between a first apparatus and a second apparatus according to an embodiment of the invention.

FIG. 2 illustrates actions in the UE and trigger used to establish this association.

Referring to FIGS. 1 and 2, when the UE receives the handover (HO) command message 203 as defined in 3GPP TS 23.216, the UE creates an association between the EPS bearers that the UE has in place and are relevant for voice 207. This normally applies to EPS bearers with QCI=1 and SSD=speech.

The UE then creates an equivalent number of instances of the CS call control state machine 103 and transfers the transaction identifiers that were used for the calls in the PS domain 101, together with other characteristics such as the status of the calls (such as active/on hold) 211.

From that point forward, and when it wants to signal to the network anything related to the calls (that is, mid-call services), the UE uses these transaction identifiers in the CS domain, as it normally does for CS calls.

Figure 3A:
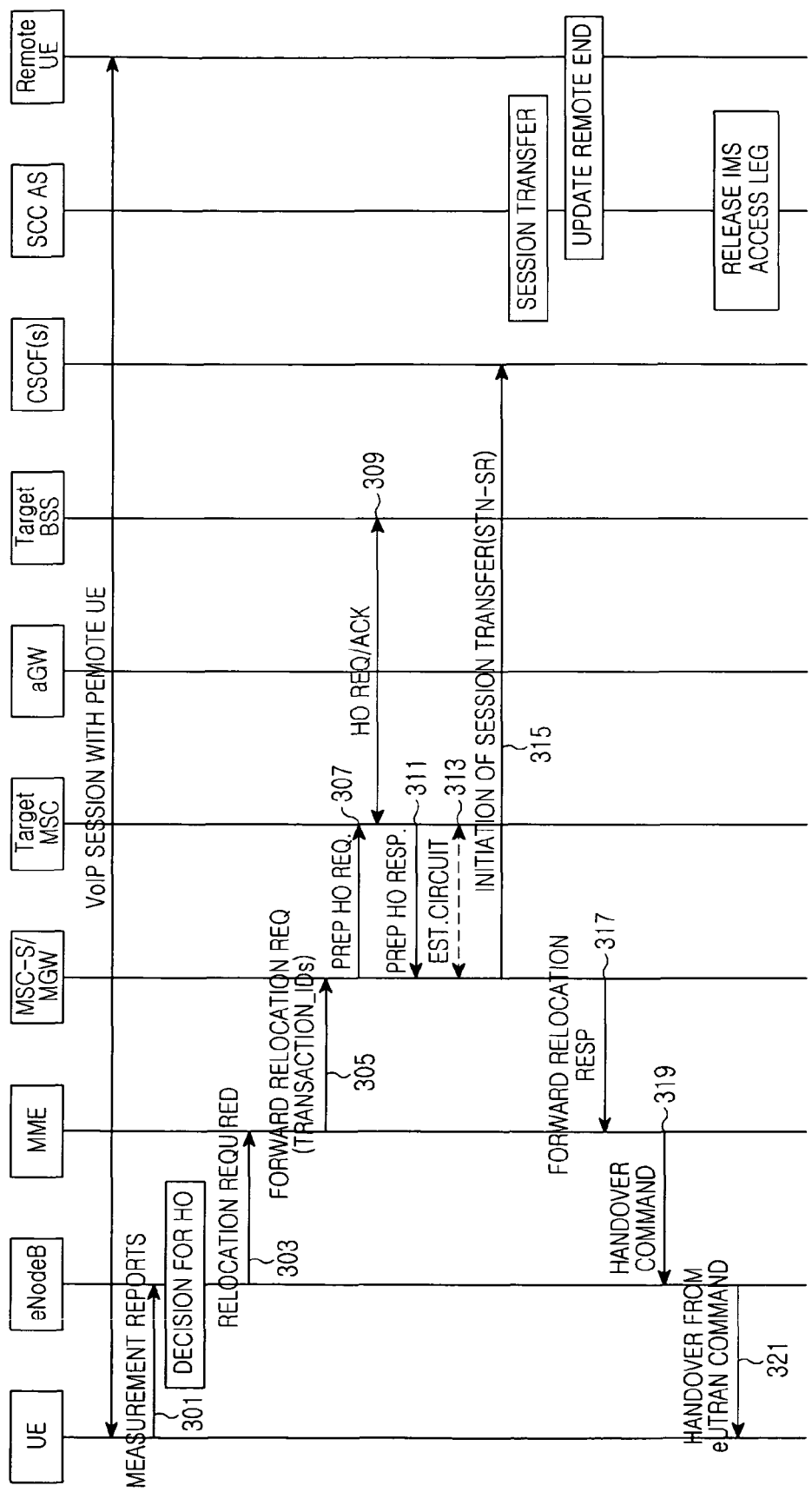
FIGS. 3A and 3B illustrate a signaling flow according to an embodiment of the invention.
Figure 3B:
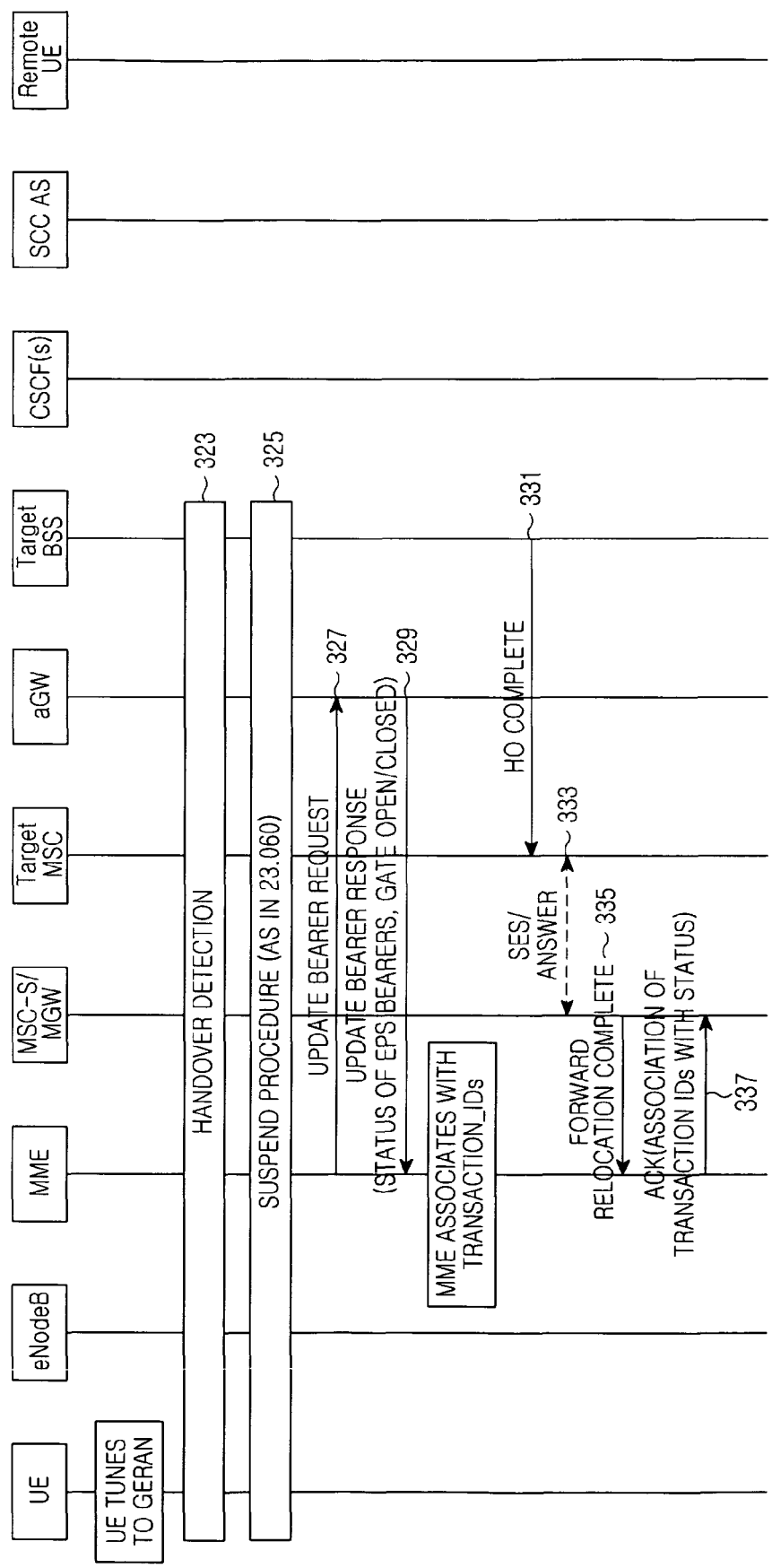

Referring now to FIGS. 3A and 3B, with regard to network procedures in embodiments of the invention, the essence of the changes to the flow already described in 3GPP TS 23.216, for example section 6.2.2.1, are as follows:

Upon SRVCC handover, the MME sends all the transaction IDs that are used for the EPS bearers with QCI=1 and SSD=speech for this particular UE 337. This allows the MSC-S to identify the number of different voice sessions that the UE has in place, but it still does not have the status of each one of those voice sessions in terms of whether they are active or on hold.

The MSC-S performs the handover procedures 307-317. If the MSC-S does not support SIP, it sends the session transfer without utilizing SIP by sending the equivalent ISDN User Part (ISUP) initial address message (IAM) message to a Media Gateway Control Function (MGCF) that is translated to a SIP INVITE request towards the SCC AS. If the MSC-S supports SIP it can send the SIP INVITE directly. If more than one session transaction IDs are passed from the MME, the MSC-S at this stage transfers only one of the sessions.

The handover procedure proceeds according to 3GPP TS 23.216. In the Update Bearer Response 327 that is being sent by the Access Gateway (aGW) to the MME, the aGW provides the status for each of the different EPS bearers in terms of whether they are active or on hold (gate open/closed).

The MME associates the status of the EPS bearers with the transaction identifiers they correspond to and updates the status to the MSC-S in the ACK 337 to the Forward Relocation Complete message 335 to the MSC-S.

The MSC-S transfers the rest of the sessions for the UE.

The signaling flow in an embodiment of the invention is illustrated in FIGS. 3A and 3B. Further details of this flow are described below (note that only the differences between the signaling flow in an embodiment of the invention and the flow described in section 6.2.2.1 of 3GPP TS 23.216 are described here):

Measurement Reports 301 from the UE to the eNodeB: according to 3GPP TS 23.216.

Relocation Required message 303 from the eNodeB to the MME: according to 3GPP TS 23.216.

Forward Relocation Request 305: based on the Quality of Service (QoS) Class Identifier (QCI) associated with the voice bearer (QCI 1) and the SRVCC handover indication, the source MME splits the voice bearers from the non voice bearers and initiates the PS-CS handover procedure for the voice bearers only towards the MSC Server. The MME sends a Forward Relocation Request to the MSC-S according to in 3GPP TS 23.216. The addition in this step is the inclusion of all the transaction identifiers for the corresponding voice bearers that the UE has in place at the time of the handover.

Prepare Handover Request message 307 from the MSC-S to the Target MSC: according to 3GPP TS 23.216.

Handover Request and Acknowledgement 309 between the Target MSC and the Target Base Station Server (BSS): according to 3GPP TS 23.216.

Prepare Handover Response 311 from the Target MSC back to the MSC-S: according to 3GPP TS 23.216.

Establish Circuit 313 between the MSC-S and the Target MSC: according to 3GPP TS 23.216.

Initiation of Session Transfer 315 from the MSC-S to the Call Session Control Function(s) (CSCF): according to 3GPP TS 23.216.

Forward Relocation Response 317 from the MSC-S to the MME: according to 3GPP TS 23.216.

Handover Command 319 from the MME to the eNodeB: according to 3GPP TS 23.216.

Handover from Evolved UMTS Terrestrial Radio Access Network (EUTRAN) Command 321 from the eNodeB to the UE: according to 3GPP TS 23.216.

Handover Detection 323: according to 3GPP TS 23.216.

Suspend Procedure 325: according to 3GPP TS 23.216.

Update Bearer Request 327 from the MME to the aGW: according to 3GPP TS 23.216.

Update Bearer Response 329 from the aGW to the MME: the aGW in the Update Bearer Request response message sends the status of all the EPS bearers in terms of whether the gate is open or closed and whether the bearer is active. A unique indication for whether a call is on hold or active is provided for the EPS bearers with QCI=1. The MME at this stage associates the status with the transaction identifiers that correspond to each bearer.

Handover Complete 331 from the Target BSS to the Target MSC: according to 3GPP TS 23.216.

Forward Relocation Complete message 335 from the MSC-S to the MME: according to 3GPP TS 23.216.

Acknowledgement from the MME to the MSC-S: the MME returns the ACK to the Forward Relocation Response message, containing the status of each call corresponding to each transaction identifier. This provides the status of the call to the MSC-S. The MSC-S now has all the required transaction identifiers and the status of the calls and is in sync with the UE. The MSC-S after this step transfers all the remaining calls this particular UE has in place, if any.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Accordingly, embodiments provide a program comprising code for implementing a system or method as claimed in any one of the claims of this specification and a machine-readable storage storing such a program. Still further, such programs may be conveyed electronically via any medium such as a communication signal carried over a wired or wireless connection and embodiments suitably encompass the same.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A communication method for providing a voice communication between a first apparatus and a second apparatus, the method comprising:
   establishing, by the first apparatus, a voice call between the first apparatus and the second apparatus to provide the voice communication;
   generating, by the first apparatus, an identifier configured to identify the voice call;
   during a first portion of the voice call, providing the voice communication using a packet switched technique comprising conveying packets of voice data between the first apparatus and the second apparatus using a communication connection that is labeled with the identifier;
   during a second portion of the voice call, providing the voice communication using a circuit switched technique comprising allocating a defined route to convey the voice data between the first apparatus and the second apparatus and using the route to convey the voice data between the first and second apparatus; and
   during the second portion of said voice call, using the identifier to manage said voice call.

2. The method of claim 1, further comprising:
   before the second portion, determining an existence of the voice call.

3. The method of claim 2, wherein determining the existence of the voice call comprises identifying the voice call from a plurality of communication connections between the first apparatus and other apparatuses.

4. The method of claim 2, further comprising using a Mobility Management Entity (MME) to determine the existence of the voice call.

5. The method of claim 1, wherein using the identifier to manage the voice call comprises using the identifier to identify the voice call and perform at least one mid-call service to the voice call.

6. The method of claim 1, wherein using the identifier to manage the voice call comprises using the identifier to identify the voice call and switch the voice call between an active state and a hold state during the second portion.

7. The method of claim 1, wherein maintaining the identifier to manage the voice call between the first portion and the second portion of the voice call is performed using a mechanism of Single Radio Voice Call Continuity (SRVCC).

8. The method of claim 1, further comprising transmitting the identifier.

9. The method of claim 8, wherein the transmitting the identifier comprises transmitting the identifier before the second portion.

10. The method of claim 8, wherein the transmitting the identifier comprises transmitting the identifier from a Mobility Management Entity (MME).

11. The method of claim 8, wherein the transmitted identifier is received at a Mobile Switching Center Server (MSC-S).

12. The method of claim 1, further comprising transmitting information indicative of a state of the voice call.

13. The method of claim 12, wherein transmitting the information indicative of the state of the voice call comprises transmitting the information before the second portion.

14. The method of claim 12, wherein transmitting the information indicative of the state of the voice call comprises transmitting the information from a Mobility Management Entity (MME).

15. The method of claim 12, wherein the transmitted information is received at a Mobile Switching Center Server (MSC-S).

16. A communication method comprising:
   establishing, by a first apparatus, a plurality of voice calls between a first apparatus and a respective plurality of second apparatuses to provide voice communication between the first apparatus and each respective second apparatus;
   generating, by the first apparatus, a respective identifier (ID) to identify a respective voice call;
   during a first portion of the respective voice call, providing the voice communication using a packet switched technique comprising conveying a plurality of packets of voice data between the first apparatus and each respective second apparatus via a respective communication connection that is labeled with the respective identifier;
   during a second portion of the respective voice call, providing the voice communication using a circuit switched technique comprising allocating a respective defined route to convey voice data between the first apparatus and each respective second apparatus and using the respective defined route to convey the voice data between the first apparatus and each respective second apparatus; and
   during the second portion of the respective voice call, using the respective identifier to manage each the respective voice call.

17. The communication method of claim 16, further comprising:
   using a Mobility Management Entity (MME) to establish the plurality of voice calls;
   using a Mobile Switching Center Server (MSC-S) to allocate the respective routes; and
   transmitting a plurality of respective identifiers (IDs) from the MME to the MSC-S.

18. The communication method of claim 16, wherein each said respective ID is a transaction ID (Non-Access Stratum (NAS) ID) of the respective communication connection that is used to transport the packets of the respective voice call in the first portion of the respective voice call.

19. The communication method of claim 18, wherein the respective ID used to manage the respective voice call during the second portion of the respective voice call is the transaction ID that is used to transport the plurality of packets of the voice data call in the first portion of the respective voice call.

20. An apparatus for providing a voice communication between the apparatus and another apparatus, the apparatus comprising:
   a communication module; and
   a controller,
   wherein the controller establishes a voice call between the apparatus and the another apparatus to provide the voice communication, and generates an identifier configured to identify the voice call,
   wherein during a first portion of the voice call, the communication module is configured to provide the voice communication using a packet switched technique comprising conveying packets of voice data between the apparatus and the another apparatus using a communication connection that is labeled with the identifier,
   wherein during a second portion of the voice call, the communication module is configured to provide the voice communication using a circuit switched technique comprising allocating a defined route to convey the voice data between the apparatus and the another apparatus and the communication module is configured to use the route to convey the voice data between the apparatus and the another apparatus, and
   wherein during the second portion of the voice call, the communication module is configured to use the identifier to manage the voice call.

21. An apparatus for providing a voice communication between the apparatus and other apparatuses, the apparatus comprising:
   a communication module; and
   a controller,
   wherein the controller is configured to establish a plurality of voice calls between the apparatus and a respective other apparatuses to provide voice communication between the apparatus and each respective other apparatus, and generate a respective identifier (ID) to identify a respective voice call,
   wherein during a first portion of the respective voice call, the communication module is configured to provide the voice communication using a packet switched technique comprising conveying a plurality of packets of voice data between the apparatus and each respective other apparatus via a respective communication connection that is labeled with the respective identifier;
   wherein during a second portion of the respective voice call, the communication module is configured to provide the voice communication using a circuit switched technique comprising allocating a respective defined route to convey voice data between the apparatus and each respective other apparatus and the communication module is configured to use the respective defined route to convey the voice data between the apparatus and each respective other apparatus, and
   wherein during the second portion of the respective voice call, the communication module is configured to use the respective ID to manage the respective voice call.

* * * * *